US012776531B2

(12) United States Patent
Koga

(10) Patent No.: US 12,776,531 B2
(45) Date of Patent: Oct. 27, 2026

(54) ELECTRICAL DEVICE

(71) Applicant: Panasonic Intellectual Property Management Co., Ltd., Osaka (JP)

(72) Inventor: Eiichi Koga, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 640 days.

(21) Appl. No.: 18/209,278

(22) Filed: Jun. 13, 2023

(65) Prior Publication Data

US 2023/0327232 A1 Oct. 12, 2023

Related U.S. Application Data

(63) Continuation of application No. PCT/JP2021/039562, filed on Oct. 26, 2021.

(30) Foreign Application Priority Data

Dec. 28, 2020 (JP) ................................ 2020-219525

(51) Int. Cl.
*H01M 10/00* (2006.01)
*H01M 10/653* (2014.01)
*H01M 50/553* (2021.01)
*H01M 50/566* (2021.01)

(52) U.S. Cl.
CPC ....... *H01M 10/653* (2015.04); *H01M 50/553* (2021.01); *H01M 50/566* (2021.01)

(58) Field of Classification Search
CPC ............. H01M 50/553; H01M 50/543; H01M 50/581; H01M 8/0232; Y02E 60/10
See application file for complete search history.

(56) References Cited

U.S. PATENT DOCUMENTS

2011/0170221 A1 7/2011 Koyama
2019/0363334 A1 11/2019 Motokawa et al.

FOREIGN PATENT DOCUMENTS

CN 108400276 A * 8/2018 ............ H01M 50/54
CN 111162234 A * 5/2020 .......... H01M 50/572
JP S61-074257 A 4/1986

(Continued)

OTHER PUBLICATIONS

Jin et al., Cell and Battery Using Same, Jan. 2018, See the Abstract. (Year: 2018).*

(Continued)

*Primary Examiner* — Tiffany Legette
*Assistant Examiner* — Monique M Wills
(74) *Attorney, Agent, or Firm* — WHDA, LLP

(57) ABSTRACT

A battery that is an example of an electrical device according to the present disclosure includes: an electrical element having a current collector such as a battery element having a current collector; a lead terminal electrically connected to the current collector; a joining portion containing an electrically-conductive resin material and joining the current collector and the lead terminal to each other; and a heat-melting portion that is disposed between the joining portion and the lead terminal and that contains a solder material. The heat-melting portion may be in contact with the lead terminal. The joining portion may be in contact with the current collector and the heat-melting portion.

19 Claims, 4 Drawing Sheets

(56) References Cited

FOREIGN PATENT DOCUMENTS

| | | | | | |
|---|---|---|---|---|---|
| JP | S63-086252 | A | | 4/1988 | |
| JP | H04-286859 | A | | 10/1992 | |
| JP | H06-196151 | A | | 7/1994 | |
| JP | H10-004002 | A | | 1/1998 | |
| JP | 2001-043846 | A | | 2/2001 | |
| JP | 2001-313202 | A | | 11/2001 | |
| JP | 2004253340 | A | * | 9/2004 | |
| JP | 2008-053652 | A | | 3/2008 | |
| JP | 2013-098093 | A | | 5/2013 | |
| JP | 2014045204 | A | * | 3/2014 | |
| KR | 20130125587 | A | * | 11/2013 | .............. H01M 4/74 |
| WO | 2009/148152 | A1 | | 12/2009 | |
| WO | WO-2018001164 | A1 | * | 1/2018 | .............. H01M 4/70 |
| WO | 2018/096926 | A1 | | 5/2018 | |

OTHER PUBLICATIONS

Nishimura et al., Electrochemical Element, Sep. 2004, See the Abstract. (Year: 2004).*

Kim et al., A Current Collector for a Battery Comprising a Metal Mesh, Nov. 2013, See the Abstract. (Year: 2013).*

Liu et al., Winding Lithium Ion Battery, May 2020 See the Abstract. (Year: 2020).*

Tawara et al., Electrochemical Cell With Lead Terminal, Mar. 2014, See the Abstract. (Year: 2014).*

Yamamoto et al., Secondary Battery and Manufacturing Method Thereof, Aug. 2018, See the Abstract. (Year: 2018).*

International Search Report issued on Dec. 14, 2021 in International Patent Application No. PCT/JP2021/039562, with English translation.

* cited by examiner

ELECTRICAL DEVICE

CROSS-REFERENCE OF RELATED APPLICATIONS

This application is a Continuation of International Patent Application No. PCT/JP2021/039562, filed on Oct. 26, 2021, which in turn claims the benefit of Japanese Patent Application No. 2020-219525, filed on Dec. 28, 2020, the entire disclosures of which Applications are incorporated by reference herein.

BACKGROUND OF THE INVENTION

1. Field of the Invention

The present disclosure relates to an electrical device.

2. Description of Related Art

An electrical device including an electrical element may malfunction due to abrupt heat generation in the electrical element. For example, a battery may abruptly generate heat due to short-circuiting or the like. As a technique for inhibiting such increase of a battery temperature, for example, WO2018/096926 discloses a thermal blocking mechanism for blocking electrical connection between a terminal of a battery cell and a current collector when the battery cell generates heat. The thermal blocking mechanism is specifically a mechanism in which a terminal of a lead connecting between the terminal of the battery cell and the current collector is soldered to a negative electrode side exterior bottom which is the terminal of the battery cell, and the terminal of the lead separates from the terminal of the battery cell at a solder melting temperature or higher temperature, whereby the battery cell and the current collector are electrically disconnected. JP2013-098093A discloses a battery that has a solder material as a low melting-point material disposed between a positive electrode plate and a terminal of a safety element which is electrically connected to the positive electrode plate. In the battery disclosed in JP2013-098093A, the solder material is melted due to increase of the battery temperature, whereby the positive electrode plate and the terminal of the safety element are electrically disconnected.

An electrical device such as a battery which includes an electrical element is required to prevent ignition or smoking and burning due to abnormal heat generation in the electrical element. However, a conventional electrical device that includes the above-described mechanism for addressing this problem is insufficient in reliability and there is room for improvement.

Therefore, according to the present disclosure, an electrical device having high reliability is provided.

SUMMARY OF THE INVENTION

An electrical device of the present disclosure includes:

an electrical element including a current collector;

- a lead terminal electrically connected to the current collector;
- a joining portion containing an electrically-conductive resin material and joining the current collector and the lead terminal to each other; and
- a heat-melting portion disposed between the joining portion and the lead terminal, the heat-melting portion containing a solder material.

The present disclosure provides an electrical device having high reliability.

Figure 1:
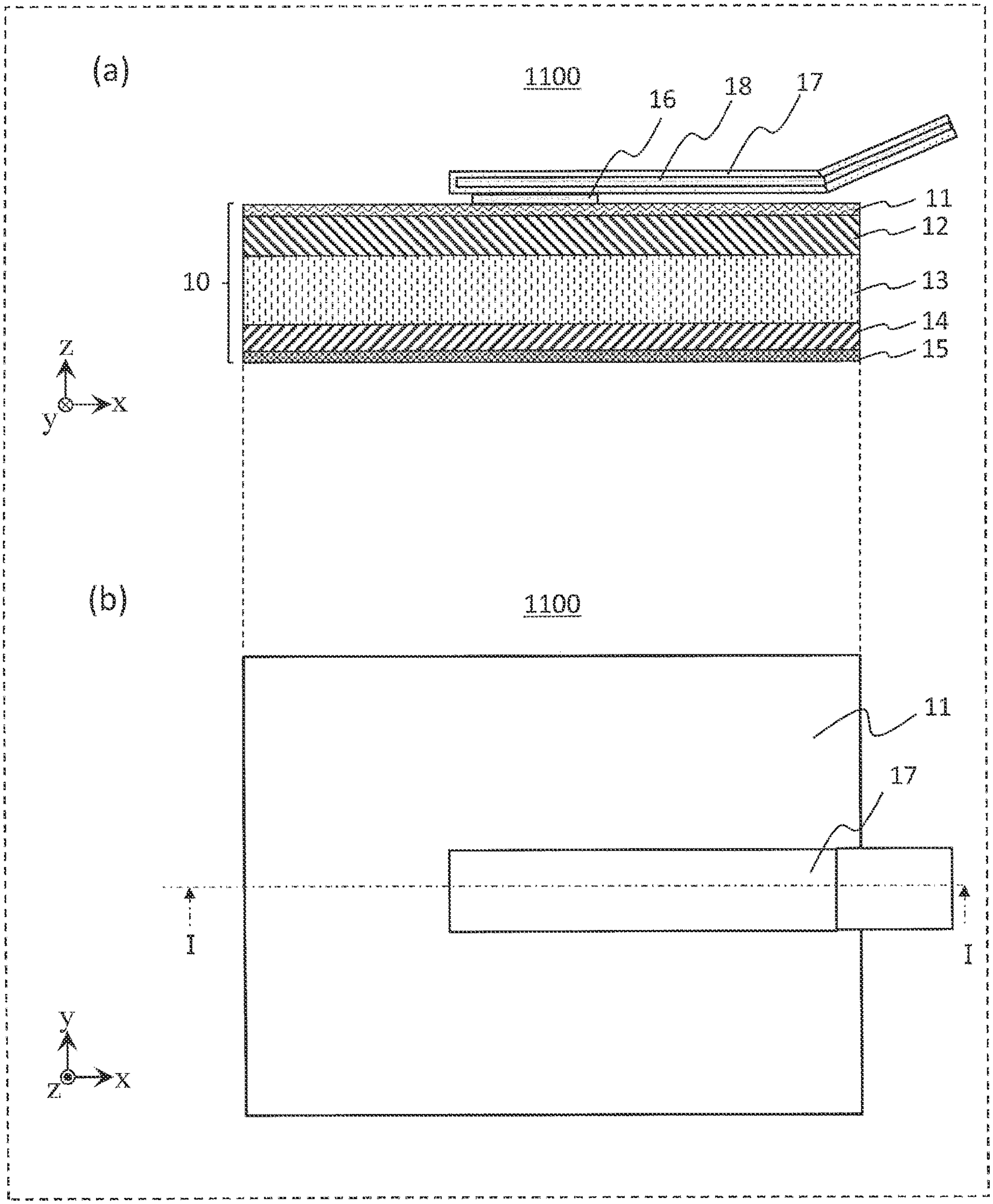
FIG. 1 is a diagram illustrating a schematic configuration of a battery 1100 according to a first embodiment.

DETAILED DESCRIPTION (Findings on which the Present Disclosure is Based)

As described in "Description of Related Art", WO2018/096926 and JP2013-098093A disclose a battery for which a technique for inhibiting increase of a battery temperature is used.

WO2018/096926 discloses, as a thermal blocking mechanism, a mechanism in which a terminal of a lead connecting between the terminal of the battery cell and the current collector is soldered to a negative electrode side exterior bottom which is the terminal of the battery cell, and the terminal of the lead separates from the terminal of the battery cell at a solder melting temperature or higher temperature, whereby the battery cell and the current collector are electrically disconnected. However, if the terminal of the lead is soldered to an all-solid state battery directly or within a short distance over which heat is easily transmitted, for example, a crack is likely to be generated at an interface between an electrode layer and solid electrolyte in the all-solid state battery due to thermal shock. Such a crack caused by thermal shock becomes significant when a solid material is densified. Therefore, reliability of the battery becomes low whereas an all-solid state battery in which the performance is enhanced through the densification can have high performance. Thus, there is a problem in conventional art in which a lead terminal is soldered and joined directly to an all-solid state battery.

JP2013-098093A discloses a battery that has a solder material as a low melting-point material disposed between a positive electrode plate and a terminal of a safety element which is electrically connected to the positive electrode plate. Specifically, the solder material as a low melting-point material is disposed between the terminal disposed at the safety element, and a positive electrode terminal connected to the positive electrode plate of a battery element via a positive electrode current collecting member. In the battery disclosed in JP2013-098093A, the solder material is melted due to increase of a battery temperature, whereby the positive electrode plate and the terminal of the safety element are electrically disconnected. However, in a case where the solder material is disposed between the terminal of the safety element and the positive electrode terminal connected to the positive electrode plate via the positive electrode current collector, if the battery abnormally generates heat, responsiveness deteriorates due to loss in a heat conductive path from the positive electrode plate to the positive electrode terminal, and heat dissipation during the loss. Therefore, in the worst case, a problem arises that the solder material does not melt. Particularly, in an environment in which an outside air temperature is low and heat dissipation is great, the temperature of the solder material does not rise to a melting temperature, and an electric conductive path between the positive electrode plate and the terminal of the safety element may not be disconnected.

Therefore, the present inventor has thoroughly examined an electrical device having an electrical element such as a battery having a battery element in order to solve the aforementioned problem of the conventional art and further enhance reliability. As a result, the present inventor has completed the electrical device of the present disclosure as described below.

EMBODIMENTS OF THE PRESENT DISCLOSURE

Embodiments of the present disclosure will be specifically described below with reference to the drawings.

The embodiments described below each represent a comprehensive or specific example. The numerical values, shapes, materials, components, positions at which the components are arranged, connecting manners, and the like which are indicated below in the embodiments are examples, and are not intended so as to limit the present disclosure.

The drawings do not necessarily provide strict illustration. In the drawings, the substantially same components are denoted by the same reference characters, and repeated description is omitted or simplified.

In the description herein and the drawings, the x-axis, the y-axis, and the z-axis represent three axes in a three-dimensional orthogonal coordinate system. In each of the embodiments, the z-axis direction represents a thickness direction of a battery as an example of an electrical device. In the description herein, the "thickness direction" represents the direction perpendicular to surfaces on which layers are stacked.

In the description herein, "planar view" means a case where the battery is viewed along the stacking direction in the battery as an example of the electrical device. In the description herein, the "thickness" represents a length, in the stacking direction, of the battery and the layers.

In the description herein, as to "inner" and "outer" in "inner side", "outer side", and the like, the "inner" represents the center side of the battery and the "outer" represents the peripheral side of the battery in a case where the battery is viewed along the stacking direction of the battery as an example of the electrical device.

In the description herein, the terms "upper" and "lower" in the configuration of the battery as an example of the electrical device do not represent the upper direction (that is, vertically upper direction) and the lower direction (that is, vertically lower direction) in absolute spatial recognition, and are used as terms defined by a relative position relationship based on the stacking order in the stacked configuration. The terms "upper side" and "lower side" are used in both a case where two components are spaced from each other and another component is between the two components, and a case where two components are in contact with each other so as to be disposed close to each other.

First Embodiment

An electrical device according to a first embodiment will be described.

The electrical device according to the first embodiment includes an electrical element having a current collector, a joining portion, a heat-melting portion, and a lead terminal. The lead terminal is electrically connected to the current collector. The joining portion contains an electrically-conductive resin material, and joins the current collector and the lead terminal to each other. The heat-melting portion is disposed between the joining portion and the lead terminal, and contains a solder material. That is, the current collector and the lead terminal are joined to each other via the joining portion and the heat-melting portion.

In the above-described configuration, for example, in a case where heat is generated in the electrical device due to abnormal heat generation in the electrical element, the solder material of the heat-melting portion is melted, and the lead terminal is separated from the joining portion. As a result, the electrical device can be electrically disconnected from an external circuit. Furthermore, in the electrical device according to the first embodiment, the current collector and the lead terminal are joined to each other by the joining portion containing an electrically-conductive resin material. Therefore, a crack can be inhibited from occurring due to thermal shock by soldering the lead terminal to the current collector as in the conventional art. Thus, the electrical device according to the first embodiment includes a mechanism for blocking electric current without degrading performance of the electrical device when heat is abnormally generated. The electrical device according to the first embodiment has high reliability since ignition or smoking is inhibited.

A battery that includes a battery element such as a secondary battery element as an electrical element will be described below as an example of the electrical device. However, the electrical device of the present disclosure is not limited to the battery described below. The following description can be applied to all kinds of electrical devices that include electrical elements. Other examples of the electrical element include power generation elements such as a solar battery element and a fuel cell element, and power storage elements such as a capacitor. Other examples of the electrical device of the present disclosure include power generation devices such as solar batteries and fuel cells, and power storage devices.

FIG. 1 is a diagram illustrating a schematic configuration of a battery 1100 according to the first embodiment.

FIG. 1(*a*) is a cross-sectional view of the battery 1100 according to the first embodiment. FIG. 1(*b*) illustrates the battery 1100 in a planar view as seen from the upper side in the z-axis direction. FIG. 1(*a*) illustrates the cross-section at positions indicated by a line I-I in FIG. 1(*b*).

As shown in FIG. 1, the battery 1100 includes a battery element 10, a joining portion 16, a heat-melting portion 17, and a lead terminal 18. The battery element 10 includes a first current collector 11 and a second current collector 15. The first current collector 11 of the battery element 10, the joining portion 16, the heat-melting portion 17, and the lead terminal 18 are disposed in this order.

As shown in FIG. 1, the heat-melting portion 17 may be in contact with the lead terminal 18. For example, the heat-melting portion 17 may cover the entire surface of the lead terminal 18 as shown in FIG. 1. In the present embodiment, hereinafter, the lead terminal 18 covered by the heat-melting portion 17 is referred to as "the lead terminal 18 having the heat-melting portion 17".

The battery element 10 includes the first current collector 11, a first active material layer 12, a solid electrolyte layer 13, a second active material layer 14, and the second current collector 15 in this order. The solid electrolyte layer 13 is disposed between the first active material layer 12 and the second active material layer 14.

The first current collector 11, the first active material layer 12, the solid electrolyte layer 13, the second active material layer 14, and the second current collector 15 each have a rectangular shape in a planar view. The shapes of the first current collector 11, the first active material layer 12, the solid electrolyte layer 13, the second active material layer 14, and the second current collector 15 in a planar view are not particularly limited. Examples of the shape other than a rectangular shape include a round shape, an ellipsoidal shape, and a polygonal shape.

In the description herein, the first current collector 11 and the second current collector 15 may be collectively referred to simply as "current collector".

The current collector may be formed of an electrically-conductive material.

The current collector is, for example, formed of stainless steel, nickel, aluminium, iron, titanium, copper, palladium, gold, platinum, or an alloy formed of two or more of them. These materials may be each formed into a foil-like shape, a plate-like shape, a mesh-like shape, or the like and used as the current collector.

The material of the current collector can be selected in consideration of a production process, a temperature in use, a pressure in use, battery operating potential applied to the current collector, or electric conductivity. Furthermore, the material of the current collector can be selected in consideration of tensile strength or heat resistance required for the battery. The current collector may be, for example, high strength electrolytic copper foil or a clad material in which different kinds of metal foils are stacked.

The current collector may have a thickness of, for example, 10 μm or more and 100 μm or less.

The surface of the current collector may be treated into an uneven rough surface for enhancing adhesion to the active material layer (that is, the first active material layer 12 or the second active material layer 14) or the joining portion 16. Thus, for example, the joining property of the current collector interface is strengthened, and the battery has enhanced mechanical and thermal reliability, and cycle characteristics. Furthermore, an area over which the current collector and the joining portion 16 are in contact with each other is increased, thereby reducing electric resistance.

The joining portion 16 contains an electrically-conductive resin material. The electrically-conductive resin material is, for example, a mixture of a resin material and an electrically conductive material. As the resin material, thermosetting resin or thermoplastic resin can be used.

Examples of thermosetting resin include (i) amino resin such as urea resin, melamine resin, and guanamine resin, (ii) epoxy resin such as bisphenol A-type epoxy resin, bisphenol F-type epoxy resin, phenol novolac epoxy resin, and alicyclic epoxy resin, (iii) oxetane resin, (iv) phenol resin such as resol-type phenol resin and novolac phenol resin, and (v) silicone-modified organic resin such as silicone epoxy and silicone polyester. As the resin, one of these materials may be used solely, or two or more of these materials may be used in combination.

In a case where thermoplastic resin is used, for example, resin having a softening point higher than a melting point of the solder material contained in the heat-melting portion 17 is selected.

As the electrically conductive material, metal particles formed of silver, copper, nickel, zinc, aluminium, palladium, gold, platinum, or an alloy in which these metals are used in combination, can be used. The shape of the metal particle may be any shape such as a spherical shape, a scaly shape, and a needle-like shape. For example, metal particles having smaller particle sizes allow an alloy reaction and dispersion to progress at a low temperature. Therefore, a particle size and a shape of the metal particle are selected as appropriate in consideration of process design and influence of thermal history on battery characteristics.

The curing temperature of the electrically-conductive resin material is desirably lower than the melting point of the solder material contained in the heat-melting portion 17. In this configuration, when the lead terminal 18 having the surface on which the heat-melting portion 17 is formed in advance is joined to the first current collector 11, the joining portion 16 can be formed at a temperature at which the solder material in the heat-melting portion 17 does not melt.

The electrically-conductive resin material is, for example, a thermosetting electrically-conductive resin material that contains the thermosetting resin, and may contain at least one selected from the group consisting of silver and copper.

As shown in FIG. 1, the joining portion 16 is, for example, in contact with the first current collector 11 and the heat-melting portion 17.

As shown in FIG. 1, the joining portion 16 is not formed on, for example, the surface opposite to the surface opposing the first current collector 11 in the lead terminal 18.

The joining portion 16 may have a thickness of, for example, 1 μm or more and 50 μm or less. In the joining portion 16 having a small thickness, the battery 1100 has reduced resistance. Therefore, in the joining portion 16 having a small thickness, battery characteristics are advantageous in that resistance loss is small, and responsiveness and temperature accuracy for separation of the lead terminal 18 from the joining portion 16 due to heat generation are enhanced. Therefore, the joining portion 16 may have a small thickness as long as the production process or reliability of the joining portion 16 can be ensured. In general, if the electrically-conductive resin material is exposed to heat-resistance temperature or higher temperature (for example, 200° C.), crack or the like is generated in the structure, and resistance is increased. Therefore, in the battery 1100, when the temperature is increased, an effect of inhibiting electrical connection to the outside is also obtained by the joining portion 16 containing the electrically-conductive resin material, in addition to separation of the lead terminal 18 from the joining portion 16.

In order to enhance reliability of the battery 1100, the electrically-conductive resin material constituting the joining portion 16 may have a Young's modulus lower than materials constituting the current collector, the heat-melting portion 17, and the lead terminal 18. That is, the electrically-conductive resin material constituting the joining portion 16 may be softer than materials constituting the current collector, the heat-melting portion 17, and the lead terminal 18. Thus, stress generated at an interface between the battery element 10 or the first current collector 11 and the joining portion 16 due to temperature change or external stress is reduced. As a result, reliability for connecting between the first current collector 11 and the lead terminal 18 having the heat-melting portion 17 is enhanced. The relative relationship in the Young's modulus can be evaluated according to displacement characteristics or the size of a recess with respect to pressure generated when a probe is pressed in.

The joining portion 16 can be formed by adjusting a kind and a shape of the material and component blending in consideration of easiness for production in the production process or stress reducing performance, that is, in consideration of resistance to thermal shock or resistance to cooling/heating cycle.

The joining portion 16 may have pores. The Young's modulus of the joining portion 16 can be adjusted by the pores. The state of the pores in the joining portion 16 can be confirmed by a standard cross-section observation technique such as an optical microscope and an electron microscope. Any cross-section can be analyzed also by means such as CT-scanning.

The joining portion 16 may further contain another electrically conductive material in addition to the electrically-conductive resin material. Examples of the electrically conductive material include metal powder formed of silver, copper, nickel, palladium, and platinum which are generally used as an electrode. As the metal powder, powder in which a plurality of kinds of metals formed of different materials or a plurality of kinds of metals having different particle diameters are blended or alloyed may be adjusted and used as long as electric conductivity or ohmic contact can be ensured.

The joining portion 16 may further contain, in addition to the electrically-conductive resin material, particles of the solid electrolyte, a raw material of the active material, or the current collector material. Thus, stress generated at an interface between the joining portion 16 and each of the current collector and the lead terminal 18 having the heat-melting portion 17 due to expansion or contraction of the battery element 10 which is caused by temperature change or charging/discharging can be made close to that of the battery element 10. Therefore, stress reducing performance by the joining portion 16 is further enhanced, and the current collector and the lead terminal 18 can be joined with high reliability.

As long as the first current collector 11 and the lead terminal 18 can be jointed to each other via the heat-melting portion 17, a range for the joining portion 16 is not limited. Therefore, the joining portion 16 may be formed at at least a part of a portion between the first current collector 11 and the heat-melting portion 17. For example, the joining portion 16 may be formed on a surface of the first current collector 11 or the heat-melting portion 17 by pattern printing so as to be partially formed. As long as the lead terminal 18 can be separated from the joining portion 16 when the heat-melting portion 17 is melted due to heat generation, the structure of the joining portion 16 is not particularly limited.

The joining portion 16 may be formed of a plurality of different electrically conductive materials. For example, electrically conductive materials having different coefficients of thermal expansion or hardnesses may be stacked. Thus, stress due to difference in a coefficient of thermal expansion between the joining portion 16 and the current collector or the lead terminal 18 is further reduced, and reliability of connection can be enhanced.

The specific gravity of the joining portion 16 is not particularly limited. However, the specific gravity is desirably low from the viewpoint of the weight energy density. From the viewpoint of the weight energy density, the electrically-conductive resin material having low specific gravity is desirable.

The heat-melting portion 17 contains a solder material. As shown in FIG. 1, in the battery 1100 according to the present embodiment, the heat-melting portion 17 is in contact with the lead terminal 18. The lead terminal 18 may be, for example, covered by a solder material that melts at a low temperature. That is, as shown in FIG. 1, the lead terminal 18 may have a surface covered by the heat-melting portion 17.

The solder material desirably has a low melting point. In order to easily separate the lead terminal 18 from the joining portion 16 before ignition or smoking occurs in the case of abnormal heat generation, the solder material may have, for example, a melting point of lower than 150° C. The solder material may contain Sn and Bi. The solder material may contain Sn and In. Examples of the solder material having a melting point of lower than 150° C. include an Sn42%-Bi58% material and an Sn48%-In52% material.

For example, the heat-melting portion 17 may have a thickness of 0.3 μm or more and 10 μm or less, and 1 μm or more and 3 μm or less. The lead terminal 18 may be covered so as to be plated with a solder material. That is, the heat-melting portion 17 may be a plating film formed of a solder material. Hereinafter, plating formed of a solder material is referred to as "solder-plating". From the viewpoint of heat capacity, the heat-melting portion 17 desirably has a small thickness. The heat-melting portion 17 having a small thickness allows enhancement of responsiveness and temperature accuracy for separation of the lead terminal 18 from the joining portion 16 during heat generation. The heat-melting portion 17 desirably has a small thickness also from the viewpoint of the volume energy density. The heat-melting portion 17 can be formed so as to cover the lead terminal 18 by solder-plating such that the heat-melting portion 17 has a thickness of, for example, 0.5 μm or more and 5 μm or less.

In the battery 1100 shown in FIG. 1, the entire surface of the lead terminal 18 is covered by the heat-melting portion 17. However, the lead terminal 18 may be partially covered by the heat-melting portion 17 at, for example, only a portion in contact with the joining portion 16 or only a joining surface. That is, the lead terminal 18 may be partially plated only at the joining portion by standard partial plating treatment. For example, the lead terminal 18 may be partially plated only at a portion in contact with the joining portion 16 or at a joining surface. That is, the heat-melting portion 17 may be formed merely at a portion joining to the joining portion 16 on the surface of the lead terminal 18. Thus, an excess solder material can be eliminated. As a result, the volume energy density or the weight energy density can be inhibited from being reduced. A solder material may be on the side surface via a ridge relative to a joining surface of the lead terminal 18. The joining surface of the lead terminal 18 is a surface opposing the first current collector 11. The side surface via the ridge relative to the joining surface is a side surface with respect to the joining surface, that is, a side surface in the case of the joining surface being a front surface. Thus, the heat-melting portion 17 may be in contact with the joining surface and the side surface of the lead terminal 18. Thus, even if the electrically-conductive resin material constituting the joining portion 16 is wet-spread over the side surface of the lead terminal 18, the lead terminal 18 is easily separated from the joining portion 16 during heat generation since the heat-melting portion 17 is disposed also on the side surface. The side surface via the ridge relative to the joining surface of the lead terminal 18 tends to have a temperature lower than that of the joining surface that is in direct contact with a heat generation source. Therefore, a melting temperature of the solder material contained in the heat-melting portion 17 disposed on the side surface is desirably lower than a melting temperature of the solder material contained in the heat-melting portion 17 disposed on the joining surface. That is, in a case where the heat-melting portion 17 is disposed in contact with the joining surface and the side surface of the lead terminal 18, the solder material constituting the heat-melting portion 17 desirably includes a first solder material and a second solder material having a melting point lower than that of the first solder material, the first solder material is desirably in contact with the joining surface, and the second solder material is desirably in contact with the side surface.

A melting temperature of the solder material can be adjusted by selecting composition ratios of contained elements (for example, Sn, Bi, or In).

The lead terminal 18 may be, but is not particularly limited to, a conductor. A conductor having low resistance and high thermal conductivity is particularly preferable.

Examples of a material of the lead terminal 18 include stainless steel, nickel, aluminium, iron, titanium, copper, and phosphor bronze.

The lead terminal 18 may have a thickness of, for example, 200 μm or more and 3000 μm or less. From the viewpoint of the weight and volume, the lead terminal 18 may have a thickness of, for example, 500 μm or more and 1000 μm or less.

The lead terminal 18 may be formed by punching using a die or formed by etching. In the lead terminal 18, thorny machining burr having a size of several tens of μm on the end surface is desirably removed by, for example, polishing or brushing. Thus, unnecessary contact with the first current collector 11 and damage to the first current collector 11 can be prevented after the lead terminal 18 has separated from the first current collector 11.

The joining surface of the lead terminal 18 is not limited to a flat surface, and may have an uneven structure. For example, the joining surface of the lead terminal 18 may have recesses and projections in which the height difference is more than or equal to 1 μm and less than or equal to 1000 μm. Thus, an area over which the lead terminal 18 and the joining portion 16 are joined to each other is increased. Therefore, electric resistance between the lead terminal 18 and the joining portion 16 is reduced and joining strength is increased. As a result, reliability of connection can be further enhanced while influence on battery characteristics due to the joining portion 16 and the heat-melting portion 17 being disposed is reduced.

The shape of the lead terminal 18 is not limited. The lead terminal 18 may have a rectangular cross-section. The lead terminal 18 may have a trapezoidal cross-section. In this case, in the lead terminal 18, a surface corresponding to the short base of the trapezoidal cross-section is used as a surface joining to the first current collector 11. That is, in a case where the lead terminal 18 is joined to the joining portion 16 via the heat-melting portion 17, frictional resistance is reduced on the side surface in the case of the lead terminal 18 being separated from the joining portion 16. As a result, responsiveness for separation of the lead terminal 18 from the joining portion 16 due to heat generation is enhanced.

The lead terminal 18 may have a triangular cross-section. In this case, for example, the lead terminal 18 is disposed such that a surface including the vertex of the triangular cross-section opposes the first current collector 11 in the lead terminal 18. That is, in this case, for example, in the lead terminal, the surface including the vertex of the triangular cross-section is joined to the joining portion 16 via the heat-melting portion 17. In this configuration, frictional resistance is reduced on the side surface in the case of the lead terminal 18 being separated from the first current collector 11. As a result, responsiveness for separation of the lead terminal 18 from the joining portion 16 due to heat generation is enhanced.

As shown in FIG. 1, the lead terminal 18 may be bent. By such a bent shape, the lead terminal 18 is easily separated from the joining portion 16 when the heat-melting portion 17 melts.

The first active material layer 12 is, for example, in contact with the first current collector 11. The first active material layer 12 contains, for example, a positive electrode active material. That is, the first active material layer 12 is, for example, a positive electrode active material layer.

The positive electrode active material is a substance in which metal ions such as lithium (Li) ions and magnesium (Mg) ions are intercalated into or deintercalated from a crystal structure at a potential higher than that of a negative electrode, and oxidation or reduction is performed according thereto.

In a case where the battery element 10 is, for example, a lithium secondary battery, the positive electrode active material is a substance in which lithium (Li) ions are intercalated or deintercalated, and oxidation or reduction is performed according thereto. In this case, the positive electrode active material is, for example, a compound containing lithium and a transition metal element. The compound is, for example, an oxide containing lithium and a transition metal element or a phosphoric acid compound containing lithium and a transition metal element.

Examples of the oxide containing lithium and a transition metal element include layered oxides such as lithium nickel composite oxides such as $LiNi_xM_{1-x}O_2$ (in which M represents at least one selected from the group consisting of Co, Al, Mn, V, Cr, Mg, Ca, Ti, Zr, Nb, Mo, and W, and $0<x\leq 1$ is satisfied), lithium cobalt oxide ($LiCoO_2$) and lithium nickel oxide ($LiNiO_2$), and lithium manganate (for example, $LiMn_2O_4$, $Li_2MnO_3$, or $LiMnO_2$) having a spinel structure.

Examples of the phosphoric acid compound containing lithium and a transition metal element include lithium iron phosphate ($LiFePO_4$) having an olivine structure.

As the positive electrode active material, sulfur (S) or sulfide such as lithium sulfide ($Li_2S$) may be used. In this case, the positive electrode active material particles may be coated with lithium niobate ($LiNbO_3$) or the like, or lithium niobate ($LiNbO_3$) or the like may be added to the positive electrode active material particles.

For the positive electrode active material, one of these materials may be used solely, or two or more of these materials may be used in combination.

In order to enhance lithium ion conductivity or electronic conductivity, the first active material layer 12 may contain, in addition to the positive electrode active material, a material other than the positive electrode active material. That is, the first active material layer 12 may be a mixture layer. Examples of the material include solid electrolytes such as inorganic solid electrolytes and sulfide-based solid electrolytes, a conductive additive such as acetylene black, and a binder such as polyethylene oxide and polyvinylidene fluoride for binding use.

The first active material layer 12 may have a thickness of, for example, 5 μm or more and 300 μm or less.

The second active material layer 14 is, for example, in contact with the second current collector 15. The second active material layer 14 contains, for example, a negative electrode active material. That is, the second active material layer 14 is, for example, a negative electrode active material layer.

The negative electrode active material is a substance in which metal ions such as lithium (Li) ions and magnesium (Mg) ions are intercalated into or deintercalated from a crystal structure at a potential lower than that of a positive electrode, and oxidation or reduction is performed according thereto.

In a case where the battery element 10 is, for example, a lithium secondary battery, the negative electrode active material is a substance in which lithium (Li) ions are intercalated or deintercalated, and oxidation or reduction is performed according thereto. In this case, examples of the negative electrode active material include carbon materials such as natural graphite, artificial graphite, graphite carbon fiber, and resin baked carbon, and alloy-based materials with which a solid electrolyte is mixed. Examples of the alloy-based material include lithium alloys such as LiAl, LiZn, $Li_3Bi$, $Li_3Cd$, $Li_3Sb$, $Li_4Si$, $Li_{4.4}Pb$, $Li_{4.4}Sn$, $Li_{0.17}C$, and $LiC_6$, oxides of lithium and a transition metal element such as lithium titanate ($Li_4Ti_5O_{12}$), and metal oxides such as zinc oxide (ZnO) and silicon oxide ($SiO_x$).

For the negative electrode active material, one of these materials may be used solely, or two or more of these materials may be used in combination.

In order to enhance lithium ion conductivity or electronic conductivity, the second active material layer 14 may contain, in addition to the negative electrode active material, a material other than the negative electrode active material. Examples of the material include solid electrolytes such as inorganic solid electrolytes and sulfide-based solid electrolytes, a conductive additive such as acetylene black, and a binder such as polyethylene oxide and polyvinylidene fluoride for binding use.

The second active material layer 14 may have a thickness of, for example, 5 μm or more and 300 μm or less.

In FIG. 1, the shapes, the positions, and the sizes of the first current collector 11, the first active material layer 12, the solid electrolyte layer 13, the second active material layer 14, and the second current collector 15 are, for example, the same in a planar view. The solid electrolyte layer 13 is, for example, in contact with the first active material layer 12 and the second active material layer 14.

The solid electrolyte layer 13 contains a solid electrolyte. The solid electrolyte layer 13 contains, for example, a solid electrolyte as a main component. The main component refers to a component having the largest mass ratio among components in the solid electrolyte layer 13. The solid electrolyte layer 13 may be formed of a solid electrolyte only.

The solid electrolyte may be a known solid electrolyte for batteries which has ion conductivity. As the solid electrolyte, for example, a solid electrolyte that conducts metal ions such as lithium ions and magnesium ions can be used As the solid electrolyte, for example, an inorganic solid electrolyte such as a sulfide-based solid electrolyte and an oxide-based solid electrolyte can be used.

The sulfide-based solid electrolyte is, for example, lithium-containing sulfide. Examples of the lithium-containing sulfide include $Li_2S—P_2S_5$-based, $Li_2S—SiS_2$-based, $Li_2S—B_2S_3$-based, $Li_2S—GeS_2$-based, $Li_2S—SiS_2—LiI$-based, $Li_2S—SiS_2—Li_3PO_4$-based, $Li_2S—Ge_2S_2$-based, $Li_2S—GeS_2—P_2S_5$-based, and $Li_2S—GeS_2—ZnS$-based electrolytes.

Examples of the oxide-based solid electrolyte include lithium-containing metal oxide, lithium-containing metal nitride, lithium phosphate ($Li_3PO_4$), and lithium-containing transition metal oxide. Examples of the lithium-containing metal oxide include $Li_2O—SiO_2$ and $Li_2O—SiO_2—P_2O_5$. Examples of the lithium-containing metal nitride include $Li_xP_yO_{1-z}N_z$. Examples of the lithium-containing transition metal oxide include lithium titanium oxide.

For the solid electrolyte, one of these materials may be used solely, or two or more of these materials may be used in combination.

The solid electrolyte layer 13 may contain, in addition to the above-described solid electrolyte, a binder such as polyethylene oxide and polyvinylidene fluoride for binding use.

The solid electrolyte layer 13 may have a thickness of, for example, 5 μm or more and 150 μm or less.

The material of the solid electrolyte may be formed of an aggregate of particles. Alternatively, the material of the solid electrolyte may have sintered structure.

In FIG. 1, the shapes, the positions, and the widths of the joining portion 16 and the heat-melting portion 17 are the same in a planar view. However, the present disclosure is not limited thereto as long as joining strength and electric resistance are practical. Each of the joining portion 16 and the heat-melting portion 17 may have a round shape or an ellipsoidal shape. The joining portion 16 may have a shape different from that of the heat-melting portion 17.

In the above-described configuration, the battery 1100 has high reliability such that heat generation and overcurrent can be inhibited.

In the battery 1100 according to the present embodiment, the first current collector 11 and the lead terminal 18 are joined by the joining portion 16 containing the electrically-conductive resin material, and the heat-melting portion 17 containing the solder material is disposed between the lead terminal 18 and the joining portion 16. This configuration of the battery 1100 is different from the configurations of the batteries disclosed in WO2018/096926 and JP2013-098093A. The configurations and the problems of the batteries disclosed in WO2018/096926 and JP2013-098093A are as described above. Since the battery 1100 according to the present embodiment has the above-described configuration, the lead terminal 18 having the heat-melting portion 17 disposed thereon is joined to the first current collector 11 by the joining portion 16 containing the electrically-conductive resin material without imparting thermal shock. Therefore, in the battery 1100 according to the present embodiment, it is clear that problems with responsiveness and crack due to thermal shock as in the batteries disclosed in WO2018/096926 and JP2013-098093A do not arise.

An example of a method for producing the battery 1100 according to the present embodiment will be described below. Specific substances and specific numerical values described below are examples, and the method for producing the battery 1100 is not limited to the method using them.

Firstly, pastes for printing and forming the first active material layer 12 and the second active material layer 14 are produced. Hereinafter, the first active material layer 12 is described as a positive electrode active material layer, and the second active material layer 14 is described as a negative electrode active material layer.

As a raw material of the solid electrolyte which is used for a mixture of the active material layers, for example, glass powder which is formed of $Li_2S—P_2S_5$-based sulfide having triclinic crystals as a main component and which has an average particle diameter of about 10 μm, is prepared. As the raw material of the solid electrolyte, for example, glass powder having high ion conductivity (for example, from $2\times10^{-3}$ S/cm to $3\times10^{-3}$ S/cm) can be used.

As the positive electrode active material, for example, Li·Ni·Co·Al composite oxide (for example, $LiNi_{0.8}Co_{0.15}Al_{0.05}O_2$) powder having an average particle diameter of about 5 μm and a layer structure is used. A mixture in which the above-described positive electrode active material and the above-described glass powder are contained is dispersed in an organic solvent or the like, to produce paste for the positive electrode active material layer.

As the negative electrode active material, for example, natural graphite powder having an average particle diameter of about 10 μm is used. A mixture in which the above-described negative electrode active material and the above-described glass powder are contained is dispersed in an organic solvent or the like, to produce paste for the negative electrode active material layer.

Subsequently, as a material used as the first current collector 11 and the second current collector 15, for example, copper foil having a thickness of about 30 μm is prepared. Hereinafter, the first current collector 11 is described as a positive electrode current collector, and the second current collector 15 is described as a negative electrode current collector.

Each of the paste for the positive electrode active material layer and the paste for the negative electrode active material layer is printed by a screen printing method on one surface of the copper foil so as to have a predetermined shape and a thickness of about 50 μm to 100 μm. The paste for the positive electrode active material layer and the paste for the negative electrode active material layer are dried at a temperature of 80° C. to 130° C., to have a thickness of 30 μm to 60 μm. Thus, the current collectors (for example, copper foil) having the first active material layer 12 (for example, positive electrode active material layer) and the second active material layer 14 (for example, negative electrode active material layer) formed thereon, are obtained.

Subsequently, paste for the solid electrolyte layer in which a mixture containing the above-described glass powder is dispersed in an organic solvent or the like, is produced. The above-described paste for the solid electrolyte layer is printed by using a metal mask on the surfaces of the first active material layer 12 and the second active material layer 14 so as to have, for example, a thickness of about 100 μm. Thereafter, the paste for the solid electrolyte layer is dried at a temperature of 80° C. to 130° C.

Subsequently, the solid electrolyte layer printed on the first active material layer 12 and the solid electrolyte layer printed on the second active material layer 14 are stacked in contact with each other so as to oppose each other.

Subsequently, an elastic sheet (thickness of 70 μm) having an elastic modulus of about $5\times10^6$ Pa and having such a size as to perform equal division into three in the longitudinal direction is inserted at the upper surfaces of the current collectors between pressing mold plates.

Thereafter, pressing is performed for 90 seconds while the pressing mold is heated to 50° C. at a pressure of 300 MPa.

Subsequently, thermosetting conductor resin paste which contains silver particles having an average particle diameter of 0.5 μm and is to be formed into the joining portion 16 is further printed and formed by using a metal mask on the surface of the first current collector 11 so as to have a thickness of about 20 μm. Subsequently, the lead terminal 18 having a surface which has been solder-plated in advance is set to the joining portion 16 and put into a drier so as not to move them, and the temperature is increased to, for example, 120° C. in 30 minutes, and heat curing treatment is thereafter performed for one hour and cooling to room temperature is performed.

In the above-described method, the battery 1100 is obtained. Thus, in the battery 1100 according to the present embodiment, since soldering is not performed directly on the battery element 10 having the current collector formed therein, in the production process, the lead terminal mechanism can be provided while thermal shock and thermal stress are inhibited.

The method and order for forming the battery 1100 are not limited to the above-described example.

In the above-described production method, for example, the paste for the positive electrode active material layer, the paste for the negative electrode active material layer, the paste for the solid electrolyte layer, and the conductor paste are applied by printing. However, the present disclosure is not limited thereto. Examples of the printing method include a doctor blade method, a calender method, a spin coating method, a dip coating method, an inkjet method, an offset method, a die coating method, and a spray method.

In the above-described production method, thermosetting conductor paste containing silver metal particles is described as an example of the conductor resin paste. However, the present disclosure is not limited thereto. Examples of the metal component of the conductor paste include silver, copper, nickel, zinc, aluminium, palladium, gold, platinum, and alloys in which these metals are used in combination. The shape of the metal particle may be any shape such as a spherical shape, a scaly shape, and a needle-like shape. For example, metal particles having smaller particle sizes allow an alloy reaction and dispersion to progress at a low temperature. Therefore, a particle size and a shape of the metal particle are selected as appropriate in consideration of process design and influence of thermal history on battery characteristics.

The resin used for thermosetting conductor resin paste may be any resin that functions as a binder for binding use. Furthermore, an appropriate resin is selected according to a production process to be adopted in view of printability, coatability, or the like. The resin used for thermosetting conductor paste contains, for example, thermosetting resin. Examples of the thermosetting resin include (i) amino resin such as urea resin, melamine resin, and guanamine resin,
(ii) epoxy resin such as bisphenol A-type epoxy resin, bisphenol F-type epoxy resin, phenol novolac epoxy resin, and alicyclic epoxy resin,
(iii) oxetane resin,
(iv) phenol resin such as resol-type phenol resin and novolac phenol resin, and
(v) silicone-modified organic resin such as silicone epoxy and silicone polyester. As the resin, one of these materials may be used solely, or two or more of these materials may be used in combination.

Second Embodiment

A battery according to a second embodiment will be described below. The battery according to the second embodiment is a modification of the battery according to the first embodiment. The matter described in the first embodiment may be omitted.

Figure 2:
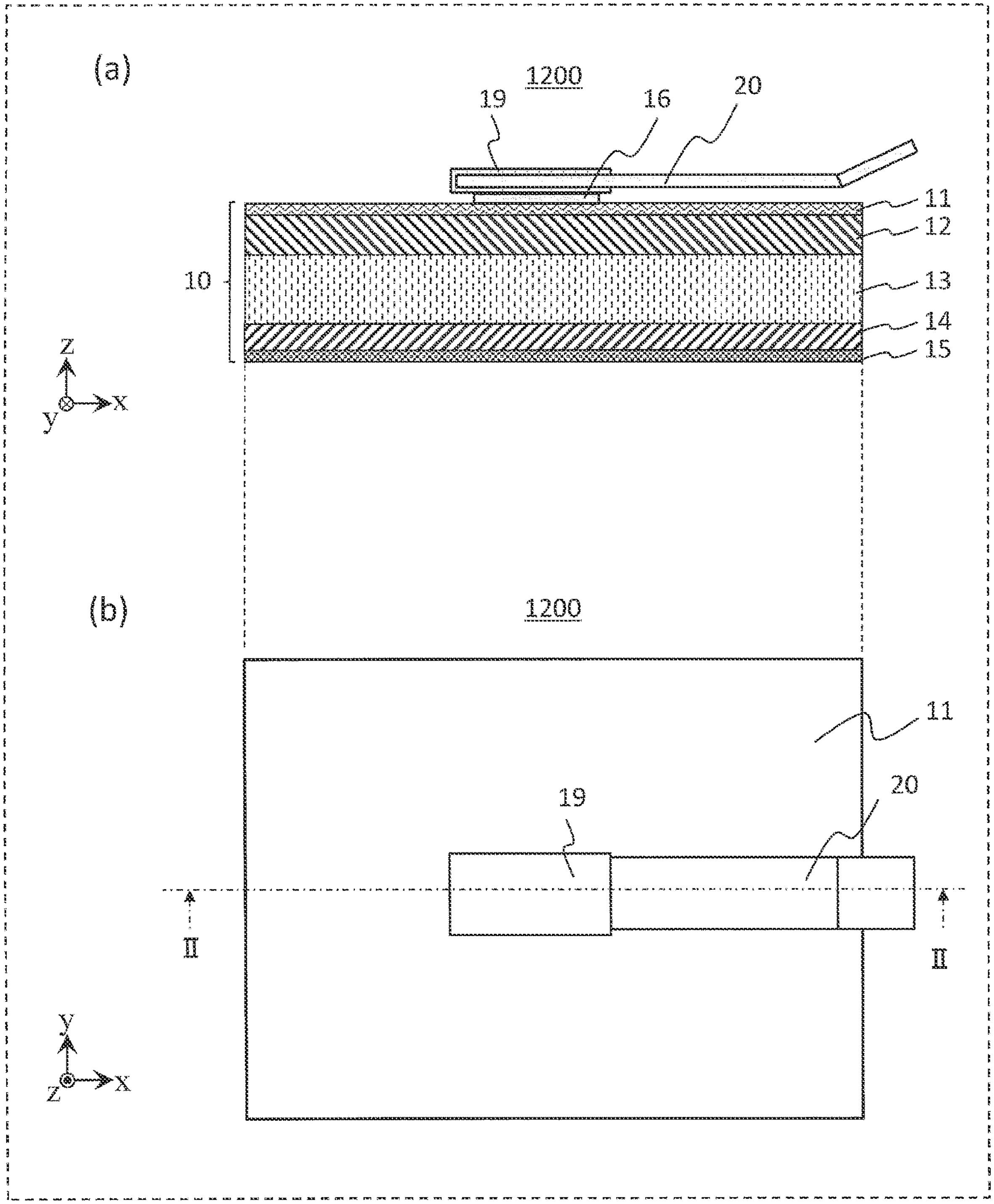
FIG. 2 is a diagram illustrating a schematic configuration of a battery 1200 according to a second embodiment.

FIG. 2 is a diagram illustrating a schematic configuration of a battery 1200 according to the second embodiment. FIG. 2(*a*) is a cross-sectional view of the battery 1200 according to the second embodiment. FIG. 2(*b*) illustrates the battery 1200 in a planar view as seen from the upper side in the z-axis direction. FIG. 2(*a*) illustrates the cross-section at positions indicated by a line II-II in FIG. 2(*b*).

As shown in FIG. 2, in the battery 1200, a lead terminal 20 is partially plated with a solder material. That is, in the battery 1200, a heat-melting portion 19 is formed of a plating film formed of the solder material. The heat-melting portion 19 partially covers the surface of the lead terminal 20. The heat-melting portion 19 has an area larger than that of the joining portion 16. In the lead terminal 20, the side surface in addition to the joining surface is also covered by the heat-melting portion 19.

The battery 1200 has high reliability such that heat generation and overcurrent can be inhibited.

Third Embodiment

A battery according to a third embodiment will be described below. The battery according to the third embodiment is a modification of the battery according to the first embodiment. The matter described in the first embodiment may be omitted.

Figure 3:
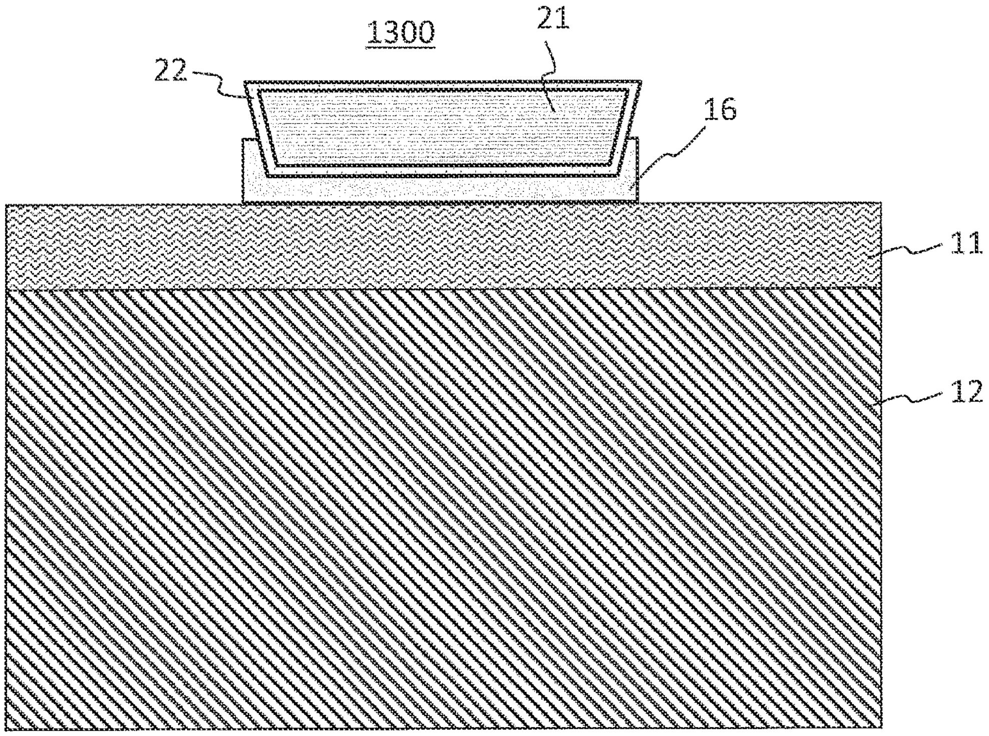
FIG. 3 is an enlarged cross-sectional view of a portion around a joining portion of a battery 1300 according to a third embodiment.

FIG. 3 is an enlarged cross-sectional view of a portion around the joining portion of the battery 1300 according to the third embodiment.

As shown in FIG. 3, in the battery 1300, a lead terminal 21 has a trapezoidal cross-section. The lead terminal 21 is partially plated with a solder material, similarly to the lead terminal 20 of the battery 1200 according to the second embodiment. In the battery 1300, a heat-melting portion 22 is formed of a plating film formed of the solder material. In the lead terminal 21, the surface corresponding to the short base of the trapezoidal cross-section is joined to the joining portion 16 via the heat-melting portion 22.

Figure 4:
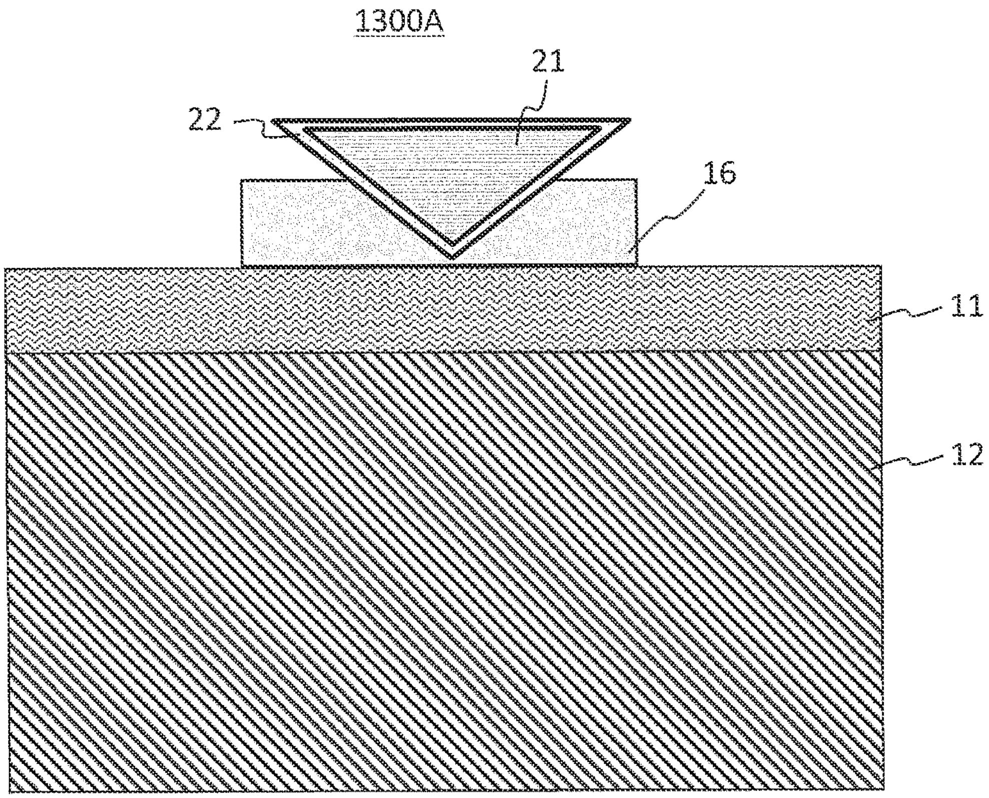
FIG. 4 is an enlarged cross-sectional view of a portion around a joining portion of a battery 1300A as a modification of the battery 1300 according to the third embodiment.

FIG. 4 is an enlarged cross-sectional view of a portion around the joining portion of a battery 1300A as a modification of the battery 1300 according to the third embodiment. As shown in FIG. 4, the lead terminal 21 may have a triangular cross-section. In this case, for example, the lead terminal 21 is disposed such that the surface including the vertex of the triangular cross-section opposes the first current collector 11 in the lead terminal 21. That is, in this case, for example, the surface including the vertex of the triangular cross-section is joined to the joining portion 16 via the heat-melting portion 22 in the lead terminal 21.

In the above-described configuration, even in a case where the electrically-conductive resin material is adhered to the lead terminal 21 on the side surface of the lead terminal 21, frictional resistance is reduced, and the lead terminal 21 is easily separated from the joining portion 16 during heat generation.

Thus, the battery 1300 has high reliability such that heat generation and overcurrent can be inhibited.

Fourth Embodiment

A battery according to a fourth embodiment will be described below. The battery according to the fourth embodiment is a modification of the battery according to the first embodiment. The matter described in the first embodiment may be omitted.

Figure 5:
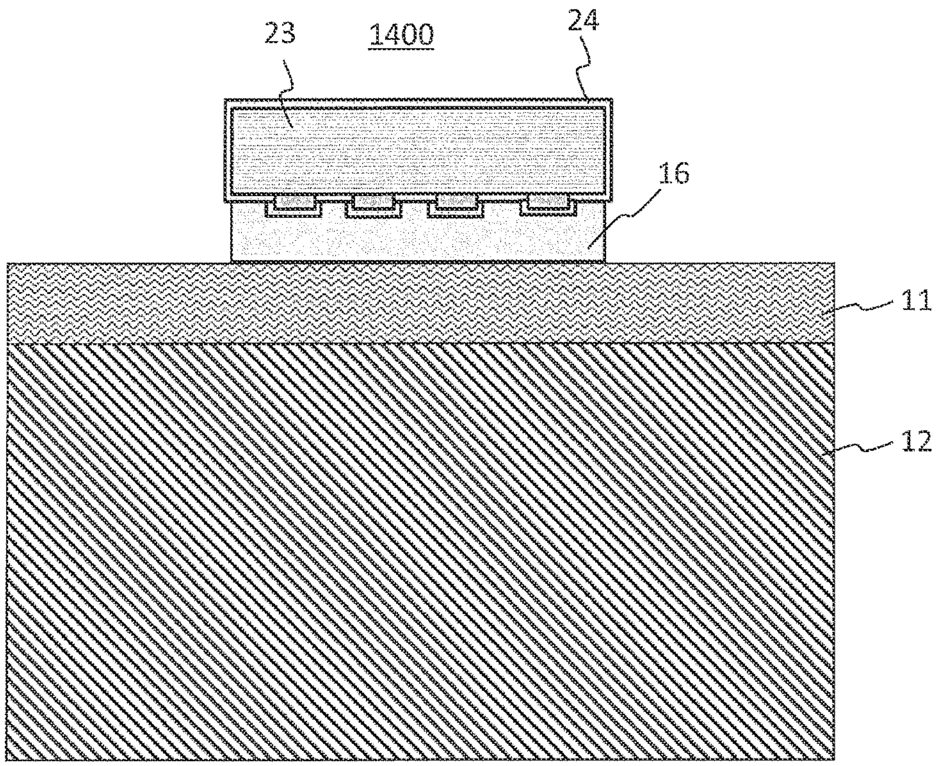
FIG. 5 is an enlarged cross-sectional view of a portion around a joining portion of a battery 1400 according to a fourth embodiment.

FIG. 5 is an enlarged cross-sectional view of a portion around the joining portion of a battery 1400 according to the fourth embodiment.

As shown in FIG. 5, in the battery 1400, the joining surface of a lead terminal 23 has an uneven shape. Therefore, in the battery 1400, the lead terminal 23 is joined to the joining portion 16 via a heat-melting portion 24 at the surface having the uneven structure.

The uneven structure in FIG. 5 is an example. The uneven structure may be a Δ-shaped structure.

In this configuration, an area over which the lead terminal 23 and the joining portion 16 are joined to each other is increased, whereby connection resistance between the lead terminal 23 and the joining portion 16 is reduced. As a result, influence on the battery characteristics due to the joining portion 16 and the heat-melting portion 24 being disposed can be reduced, and, furthermore, connection strength can be enhanced.

Fifth Embodiment

A battery according to a fifth embodiment will be described below. The battery according to the fifth embodiment is a modification of the battery according to the first embodiment. The matter described in the first embodiment may be omitted.

Figure 6:
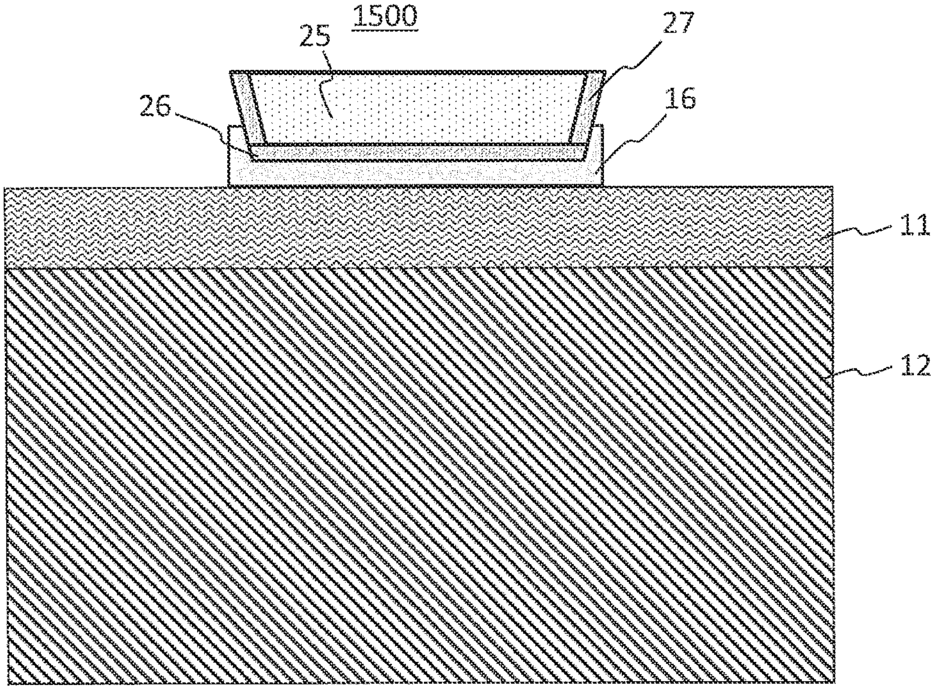
FIG. 6 is an enlarged cross-sectional view of a portion around a joining portion of a battery 1500 according to a fifth embodiment.

FIG. 6 is an enlarged cross-sectional view of a portion around the joining portion of a battery 1500 according to the fifth embodiment.

In the battery 1500, a lead terminal 25 is covered by a first solder material 26 and a second solder material 27. That is, the lead terminal 25 is covered by two kinds of solder materials. The first solder material 26 is in contact with the joining surface of the lead terminal 25. The second solder material 27 is in contact with the side surfaces of the lead terminal 25. The second solder material 27 has a melting point lower than that of the first solder material 26.

In such a configuration, even in a case where the joining portion 16 is disposed on the side surface of the lead terminal 25, the lead terminal 25 can be easily separated from the joining portion 16. Furthermore, responsiveness and temperature accuracy for separation of the lead terminal 25 from the joining portion 16 due to heat generation are enhanced.

The electrical device of the present disclosure has been described above based on the embodiments. However, the present disclosure is not limited to these embodiments. The embodiments including various modifications conceived of by a person skilled in the art, and other embodiments configured by combining some of components of the embodiments are also included in the scope of the present disclosure as long as the embodiments do not depart from the gist of the present disclosure.

In the above-described embodiments, various changes, replacements, additions, omissions, or the like can be made within the scope of the claims or the scope equivalent thereto.

INDUSTRIAL APPLICABILITY

The electrical device of the present disclosure can be used as, for example, a secondary battery used in, for example, various electronic devices or automobiles.

What is claimed is:

1. An electrical device comprising:

an electrical element including a current collector;

a lead terminal electrically connected to the current collector;

a joining portion containing an electrically-conductive resin material and joining the current collector and the lead terminal to each other; and a heat-melting portion disposed between the joining portion and the lead terminal, the heat-melting portion containing a solder material, wherein the heat-melting portion is joined to the current collector via the joining portion and is separated from the current collector by the joining portion.

2. The electrical device according to claim 1, wherein the solder material has a melting point of lower than 150° C.

3. The electrical device according to claim 1, wherein the solder material contains Sn and Bi.

4. The electrical device according to claim 1, wherein the solder material contains Sn and In.

5. The electrical device according to claim 1, wherein the heat-melting portion is in contact with the lead terminal.

6. The electrical device according to claim 1, wherein the heat-melting portion covers an entire surface of the lead terminal.

7. The electrical device according to claim 1, wherein the heat-melting portion is a plating film.

8. The electrical device according to claim 1, wherein the joining portion is in contact with the current collector and the heat-melting portion.

9. The electrical device according to claim 1, wherein the joining portion is not formed on a surface opposite to a surface opposing the current collector in the lead terminal.

10. The electrical device according to claim 1, wherein
- the lead terminal includes a joining surface opposing the current collector and a side surface relative to the joining surface, and
- the heat-melting portion is in contact with the joining surface and the side surface.

11. The electrical device according to claim 10, wherein
- the solder material includes a first solder material and a second solder material,
- the first solder material is in contact with the joining surface,
- the second solder material is in contact with the side surface, and
- the second solder material has a melting point lower than that of the first solder material.

12. The electrical device according to claim 1, wherein the electrically-conductive resin material has a curing temperature lower than a melting point of the solder material.

13. The electrical device according to claim 1, wherein the electrically-conductive resin material is a thermosetting electrically-conductive resin material, and contains at least one selected from the group consisting of silver and copper.

14. The electrical device according to claim 1, wherein the lead terminal has an uneven structure at a joining surface of the lead terminal which opposes the current collector.

15. The electrical device according to claim 1, wherein
- the lead terminal has a trapezoidal cross-section, and
- in the lead terminal, a surface corresponding to a short base of the trapezoidal cross-section is joined to the joining portion via the heat-melting portion.

16. The electrical device according to claim 1, wherein
- the lead terminal has a triangular cross-section, and
- in the lead terminal, a surface including a vertex of the triangular cross-section is joined to the joining portion via the heat-melting portion.

17. The electrical device according to claim 1, wherein the lead terminal is bent.

18. The electrical device according to claim 1, wherein
- the current collector is a positive electrode current collector, and
- the lead terminal is electrically connected to the positive electrode current collector.

19. The electrical device according to claim 1, wherein
- the electrical element further includes the first active material layer, a solid electrolyte layer, a second active material layer, and
- the heat-melting portion, the joining portion, the current collector, the first active material layer, the solid electrolyte layer, the second active material layer are stacked in this order along a stacked direction.

* * * * *